US011671665B2

(12) United States Patent
Hallmarker et al.

(10) Patent No.: US 11,671,665 B2
(45) Date of Patent: Jun. 6, 2023

(54) ADAPTIVE BITRATE CONTROL FOR SIMULTANEOUS CONTENT STREAMING

(71) Applicant: Amazon Technologies, Inc., Seattle, WA (US)

(72) Inventors: Ola Hallmarker, Segeltorp (SE); Tomas Ablad, Huddinge (SE); Kjell Christensson, Sollentuna (SE); Dan Mathiasen, Nacka (SE)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 17/182,890

(22) Filed: Feb. 23, 2021

(65) Prior Publication Data

US 2022/0272413 A1 Aug. 25, 2022

(51) Int. Cl.
*H04N 21/462* (2011.01)
*H04L 65/60* (2022.01)
*H04N 21/437* (2011.01)
*H04N 21/845* (2011.01)
*H04N 21/438* (2011.01)

(52) U.S. Cl.
CPC ......... *H04N 21/4621* (2013.01); *H04L 65/60* (2013.01); *H04N 21/437* (2013.01); *H04N 21/4383* (2013.01); *H04N 21/8456* (2013.01)

(58) Field of Classification Search
CPC ................................................... H04N 21/462
See application file for complete search history.

(56) References Cited

U.S. PATENT DOCUMENTS

| 2008/0127272 | A1* | 5/2008 | Cragun | H04L 65/1101 725/46 |
| 2011/0161485 | A1* | 6/2011 | George | H04L 43/16 709/224 |
| 2012/0302343 | A1* | 11/2012 | Hurst | H04N 21/443 463/31 |
| 2015/0365720 | A1 | 12/2015 | Hoffert et al. | |
| 2016/0255348 | A1 | 9/2016 | Panchagnula et al. | |
| 2018/0097863 | A1* | 4/2018 | Ivov | H04L 65/762 |
| 2022/0327359 | A1* | 10/2022 | Ahuja | G06N 3/063 |

OTHER PUBLICATIONS

PCT "International Search Report" App. No. PCT/2022/16335, dated Jun. 2, 2022, 15 pages.

* cited by examiner

*Primary Examiner* — Bryan Lee
(74) *Attorney, Agent, or Firm* — Eversheds Sutherland (US) LLP

(57) ABSTRACT

Systems, methods, and computer-readable media are disclosed for systems and methods for adaptive bitrate control for simultaneous content streaming. Example methods may include determining, by an adaptive bitrate controller, a first bits per pixel value associated with a first content stream at a device at a first timestamp, determining a second bits per pixel value associated with a second content stream at the device at the first timestamp, and generating a bits per pixel ranking using the first bits per pixel value and the second bits per pixel value. Some methods may include determining a bitrate improvement priority based at least in part on the bits per pixel ranking, and causing a request to improve a bitrate of the first content stream to be approved.

20 Claims, 6 Drawing Sheets

ADAPTIVE BITRATE CONTROL FOR SIMULTANEOUS CONTENT STREAMING

BACKGROUND

Certain digital content, such as movies, television shows, live content, and other video content may be streamed using electronic devices. In some instances, more than one content stream may be active at the same device at the same time. For example, a user may be streaming content using a picture-in-picture feature of an application or device. In such instances, the different content streams may compete with each other for available bandwidth, which may result in one content stream having a vastly different quality than other content that is streamed at the same time. This may result in a poor user experience. Accordingly, adaptive bitrate control for simultaneous content streaming may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
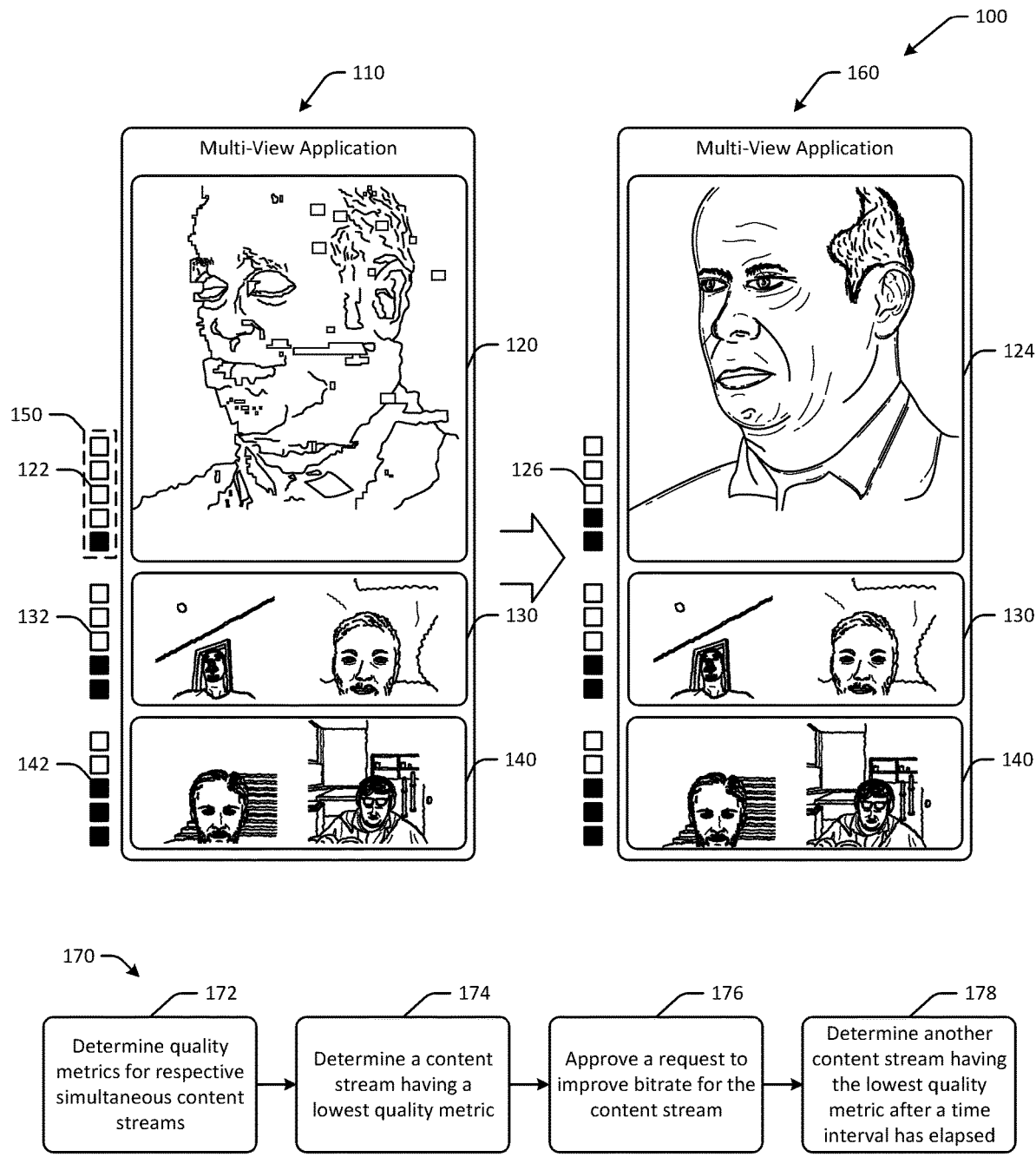
FIG. 1 is a schematic illustration of an example use case for adaptive bitrate control for simultaneous content streaming in accordance with one or more example embodiments of the disclosure.

Digital content may include video content, such as movies, television shows, streaming shows (e.g., made for Amazon Prime, Netflix, etc.), and other video content. Users may stream content using one or more devices. In some instances, users may stream more than one content stream at the same time. For example, while streaming a football game, a user may stream not only the primary view (e.g., the broadcast camera angle, etc.), but may also stream one or more additional views, such as a sideline view, a player cam view, or other views. The multiple content streams may be presented as part of the same application, or via more than one application at the same device. When viewing more than one content stream at the same time, the user experience may be diminished if there is a large discrepancy in content quality. For instance, if one content stream is significantly worse than the others, the user may not want to view the content stream anymore. Such discrepancies can occur if content streams individually compete with each other for available bandwidth.

Embodiments of the disclosure may optimize bandwidth utilization on a device, and may provide a uniform or near-uniform viewing experience by managing content stream bitrate improvements via tracking of individual quality metrics associated with individual content streams over time. Video bitrate is the amount of video data transferred in a certain period. Without a high bitrate, high resolution and high frame rate video may not appear in optimal form. In some embodiments, an adaptive bitrate controller may be used to determine or identify a content stream having a lowest bits per pixel value (or other metric indicative of stream quality), and may cause the content stream to switch to a feed with a higher bitrate, so as to improve the quality of the lowest quality content stream. Although example embodiments discussed herein are described in the context of bits per pixel values, other metrics may be used to rank different content streams. Accordingly, embodiments described herein may use any suitable quality metric instead of bits per pixel value, and rankings may be used to determine a lowest quality ranking amongst all the active content streams instead of a lowest bits per pixel value.

The bits per pixel value is the amount of data allocated to each pixel in the video. The formula is the per-second data rate divided by the view resolution (e.g., width times height). This process may occur periodically or may be based on an event, such as a content stream being initiated or canceled, a user changing a view resolution of a content stream, and/or another event that triggers a new ranking of all active content streams. Such events may trigger a new ranking of content streams and may result in an improved viewing experience for users. In some embodiments, content streams may be managed via an adaptive bitrate controller executed locally at a device, whereas in other embodiments, content streams across multiple devices on a local network may be managed by one device on the local network on which the adaptive bitrate controller is executed. Some embodiments may include an adaptive bitrate controller that ensures that the different video views in a multi-view application do not compete for the same available bandwidth, but instead uses available bandwidth so that the different views get as equal quality as possible. Some embodiments may generate rankings using a quality value that is calculated as video bitrate divided by view resolution, or bits per pixel. The stream with the lowest bits per pixel value may be allowed to switch to a higher bitrate feed if current network throughput allows an increase in quality. Accordingly, quality amongst the multiple content streams may be as even as possible, and since only one player or content stream is allowed to switch to a higher bitrate profile at a time, multiple players are not competing for the same available bandwidth.

Referring to FIG. 1, an example use case 100 for adaptive bitrate control for simultaneous content streaming is depicted in accordance with one or more example embodiments of the disclosure. In the example of FIG. 1, video content may be streamed at a device. For example, at a first point in time 110, a multi-view application may be used at a device to stream first content 120, second content 130, and third content 140 at the same time. The respective content may be streamed using the same application or multiple applications, and each content stream may be presented by different content players or player instances. At the first point in time 110, the first content stream 120 may be associated with a first quality metric 122, the second content stream 130 may be associated with a second quality metric 132, and the third content stream 140 may be associated with a third quality metric 142. The graphic representation of quality metrics illustrated in the example of FIG. 1 are only to show relative quality metrics, and may not actually be generated and/or presented in some embodiments.

The respective quality metrics may be determined by the content player application or by an adaptive bitrate controller executing on the device. The quality metrics may be determined using, for example, a video bitrate of the content stream divided by view or display resolution (e.g., a bits per pixel value). The bits per pixel value for each of the respective content streams may be used to determine which content stream has the lowest content stream quality over a time interval. The adaptive bitrate controller may rank the content streams using the quality metrics. In the example of FIG. 1, the first content stream 120 may be determined by the adaptive bitrate controller to have the lowest bits per pixel value amongst all the active content streams. The adaptive bitrate controller may therefore select the first content stream 120 for bitrate improvement. The selection of the first content stream 120 is represented by dashed lines 150 in FIG. 1. Accordingly, if the adaptive bitrate controller determines that bandwidth is available, the adaptive bitrate controller may approve a request associated with the first content stream to switch to a higher bitrate content feed or source.

For instance, at a second point in time 160, the first content stream 120 may be associated with a fourth quality metric 126, the second content stream 130 may be associated with a fifth quality metric, and the third content stream 140 may be associated with a sixth quality metric. The fourth quality metric 126 may represent the improved bitrate of the first content stream 124 relative to the previous first quality metric 122. Accordingly, the adaptive bitrate controller may continually rank the content stream quality for each active content stream and may continually allow the lowest quality stream to improve bitrate. In this manner, all of the content streams may be at uniform or near-uniform quality, and bandwidth utilization may be optimized.

To optimize bandwidth, the adaptive bitrate controller may be executed at a device and may perform operations in an example process flow 170. The device may include at least one memory that stores computer-executable instructions and at least one processor configured to access the at least one memory and execute the computer-executable instructions to perform various actions or operations, such as one or more of the operations in the process flow 170 of FIG. 1.

At a first block 172, the adaptive bitrate controller may determine quality metrics for respective simultaneous content streams. For example, the adaptive bitrate controller may determine that first content is being streamed in a first content display window of a content streaming application, that second content is being streamed in a second content display window of the content streaming application at the same time as the first content, and that third content is being streamed in a third content display window of the content streaming application at the same time as the first content.

The adaptive bitrate controller may determine quality metrics for the various content streams. In one example, quality metrics may be a bits per pixel value. Other factors and values may be used to determine quality metrics. The adaptive bitrate controller may determine a first bits per pixel value for the first content at a first timestamp, where the first bits per pixel value is indicative of a presentation quality of the first content, and may determine a second bits per pixel value for the second content at the first timestamp, where the second bits per pixel value is indicative of a presentation quality of the second content. The adaptive bitrate controller may determine a third bits per pixel value for the third content at the first timestamp, where the third bits per pixel value is indicative of a presentation quality of the third content.

At a second block 174, the adaptive bitrate controller may determine a content stream having a lowest quality metric. For example, in FIG. 1, the first content stream 120 may be determined to have the lowest quality metric (e.g., a bits per pixel value associated with the first content stream 120 is less than the bits per pixel values associated with the other content streams, etc.).

At a third block 176, the adaptive bitrate controller may approve a request to improve bitrate for the content stream associated with the lowest quality metric. For example, the adaptive bitrate controller may determine that network bandwidth is available for use by the device and/or the streaming application, and may receive a request from the content player associated with the first content stream to switch to a higher bitrate content feed or source. The adaptive bitrate controller may approve the request, thereby allowing the worst quality content stream to improve in quality. The adaptive bitrate controller may optionally reject requests from other content stream players to switch to higher bitrate feeds.

At a fourth block 178, the adaptive bitrate controller may determine another content stream having the lowest quality metric after a time interval has elapsed. The adaptive bitrate controller may continually evaluate quality metrics for the content streams and may allow improvement of the lowest quality content feed, thereby providing continuous improvement to the overall viewing experience of the multiple content streams.

For example, the adaptive bitrate controller may receive a first request from the content streaming application to switch to a video feed for the first content that has a greater bitrate than a current video feed for the first content. The adaptive bitrate controller may approve the first request. The adaptive bitrate controller may receive a second request from the content streaming application to switch to a video feed for the second content that has a greater bitrate than a current video feed for the second content, but may reject the second request because only the first content stream may switch to a content feed with an improved bitrate feed. The adaptive bitrate controller may receive a third request from the content streaming application to switch to a video feed for the third content that has a greater bitrate than a current video feed for the third content, but may reject the third request because only the first content stream may switch to a content feed with an improved bitrate feed. The adaptive bitrate controller may therefore prioritize a bitrate improvement for the first content (or other content stream with the lowest quality metric) over bitrate improvements for the second content and the third content.

Example embodiments of the disclosure provide a number of technical features or technical effects. For example, in accordance with example embodiments of the disclosure, certain embodiments of the disclosure may automatically generate bitrate improvement rankings based at least in part on quality metrics associated with content streams. Some embodiments may determine bits per pixel values for content streams and may manage content streams to improve overall viewing quality. As a result of improved functionality, bandwidth utilization may be optimized. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
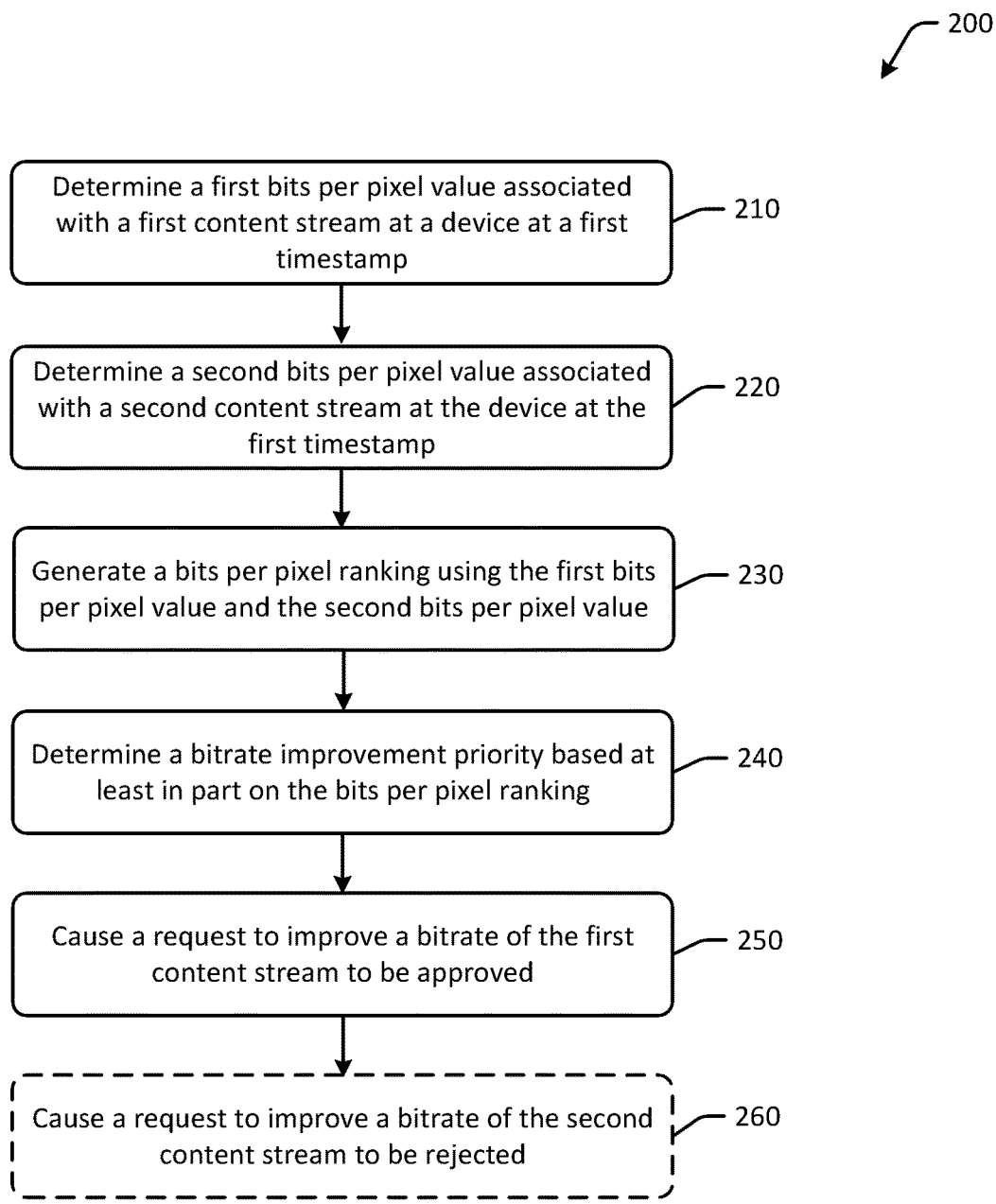
FIG. 2 is a schematic illustration of an example process flow for adaptive bitrate control for simultaneous content streaming in accordance with one or more example embodiments of the disclosure.

FIG. 2 depicts an example process flow 200 for adaptive bitrate control for simultaneous content streaming in accordance with one or more example embodiments of the disclosure. While example embodiments of the disclosure may be described in the context of movies and video, it should be appreciated that the disclosure is more broadly applicable to any type of streamable video content. Some or all of the blocks of the process flows in this disclosure may be performed in a distributed manner across any number of devices. The operations of the process flow 200 may be optional and may be performed in a different order.

In one example embodiment, the process flow 200 may be executed locally at a device to improve an overall streaming quality and/or user experience while viewing more than one content stream at the same time. For example, the user may be streaming content using two or more separate applications (e.g., Prime Video, Netflix, etc.), or may be streaming more than one content stream using the same application (e.g., utilizing a picture-in-picture feature, etc.). In another embodiment, the process flow 200 may be executed locally at a device, but the content streams may be presented at different devices on the same local network as the device. In such embodiments, the device on which the process flow 200 is executed may be a primary or master device, and may include an adaptive bit rate controller that controls bitrate improvement for content streams at a number of different devices across the local network, as discussed in more detail with respect to FIG. 4.

At block 210 of the process flow 200, computer-executable instructions stored on a memory of a device, such as a remote server or a user device, may be executed to determine a first bits per pixel value associated with a first content stream at a device at a first timestamp. For example, a content streaming engine and/or an adaptive bitrate controller executed at a device may determine a first bits per pixel value associated with a first content stream at a device at a first timestamp. The device may include a local adaptive bitrate controller used to manage bitrate quality of content streams at the device. The adaptive bitrate controller may be a software program executed at the device, and may optionally be integrated into a content streaming application, or may otherwise be executed at the device. In some embodiments, the device may further be configured to use the local adaptive bitrate controller to manage bitrate quality of content streams at other devices on the same local network as the device.

The device may determine a bits per pixel value associated with some or all of the content streams at the device at a first point in time. For example, when a content stream is initiated at the device, a content player (or content player instance) may register with the adaptive bit rate controller, indicating that a content stream is to be initiated. The content player may communicate a display resolution and a current bits per pixel value for the content stream to the adaptive bitrate controller. The display resolution may be indicative of an amount of space on the display of the device (or display associated with the device, such as a television coupled to a content streaming device, etc.) that is consumed by the particular content stream. The bits per pixel value may be indicative of a bitrate of the content stream, from which a quality metric can be inferred or determined. For example, the greater the bitrate, the greater the quality of the content stream. As network conditions change, the bits per pixel value (or the bitrate) of the content stream may change. Accordingly, the content player may provide updated display resolution and bits per pixel values to the adaptive bitrate controller periodically. For example, the adaptive bitrate controller may request and/or receive updated display resolution values and bits per pixel values from some or all simultaneous content streams at time intervals of 10 milliseconds, 20 milliseconds, 30 milliseconds, or another time interval. In some embodiments, time intervals may not be used. Instead, rankings may be updated if a view resolution changes (e.g., user changes view resolution, etc.), a video adaptive bit rate level changes due to an adaptive bit rate upshift or downshift, or another event-based trigger. Display resolution may change based on user settings, such as making one content streaming window larger than another, switching between content streams, etc. The adaptive bitrate controller may therefore determine a first bits per pixel value associated with a first content stream at the device at a first timestamp.

At block 220 of the process flow 200, computer-executable instructions stored on a memory of a device, such as a remote server or a user device, may be executed to determine a second bits per pixel value associated with a second content stream at the device at the first timestamp. For example, the content streaming engine and/or the adaptive bitrate controller executed at a device may determine a second bits per pixel value associated with a second content stream at the device at the first timestamp. The second content stream may be content that is streaming at the same time as the first content stream. The second content stream may be streamed using the same application as the first content stream, or may be streamed using another application or player instance that the first content stream.

The device may determine a bits per pixel value associated with some or all of the content streams at the device at the first point in time. For example, when a content stream is initiated at the device, a content player (or content player instance) may register with the adaptive bit rate controller, indicating that a content stream is to be initiated. The content player may communicate a display resolution and a current bits per pixel value for the content stream to the adaptive bitrate controller. The display resolution may be indicative of an amount of space on the display of the device (or display associated with the device, such as a television coupled to a content streaming device, etc.) that is consumed by the particular content stream. The bits per pixel value may be indicative of a bitrate of the content stream, from which a quality metric can be inferred or determined. For example, the greater the bitrate, the greater the quality of the content stream. As network conditions change, the bits per pixel value (or the bitrate) of the content stream may change. Accordingly, the content player may provide updated display resolution and bits per pixel values to the adaptive bitrate controller periodically. For example, the adaptive bitrate controller may request and/or receive updated display resolution values and bits per pixel values from some or all simultaneous content streams at time intervals of 10 milliseconds, 20 milliseconds, 30 milliseconds, or another time interval. Display resolution may change based on user settings, such as making one content streaming window larger than another, switching between content streams, etc. The adaptive bitrate controller may therefore determine a first bits per pixel value associated with a first content stream at the device at a first timestamp.

At block 230 of the process flow 200, computer-executable instructions stored on a memory of a device, such as a remote server or a user device, may be executed to generate a bits per pixel ranking using the first bits per pixel value and the second bits per pixel value. For example, the content streaming engine and/or the adaptive bitrate controller executed at a device may generate a bits per pixel ranking using the first bits per pixel value and the second bits per pixel value. In some embodiments, the adaptive bitrate controller may be configured to generate rankings of the active content streams (e.g., the first content stream and the second content stream, etc.) at the time intervals where updated bits per pixel values are determined for the respective content streams (e.g., every 10 milliseconds, etc.). The adaptive bitrate controller may, in some embodiments, generate a ranking based only on the most recent bits per pixels values for the active content streams. For example, based on the most recent reported bits per pixel value for each of the active content streams, the adaptive bitrate controller may generate a ranking of content streams, where the highest bits per pixel value is ranked first or last depending on the ranking configuration, and so forth. In other embodiments, the adaptive bitrate controller may be configured to generate rankings based on the most recent bits per pixel values and other factors, such as display resolution or content window player size, whether a content streaming window has a primary position on a display (e.g., the larger picture in a picture-in-picture arrangement, etc.), available network bandwidth, and/or other factors. The adaptive bitrate controller may determine, based at least in part on the first bits per pixel value and the second bits per pixel value, that the first bits per pixel value is less than the second bits per pixel value, and therefore that the first bits per pixel value is ranked lower than the second bits per pixel value. This may indicate that the quality of the first content stream is worse than the quality of the second content stream. The adaptive bitrate controller may generated updated rankings periodically. For example, an updated bits per pixel ranking may be determined for some or all active content streams every 10 milliseconds (or another time interval). The time intervals may change or may otherwise be dynamic in the sense that the time intervals may optionally be variable based at least in part on network conditions. For example, if network conditions are unstable, the time interval may be shorter than if network conditions are stable.

At block 240 of the process flow 200, computer-executable instructions stored on a memory of a device, such as a remote server or a user device, may be executed to determine a bitrate improvement priority based at least in part on the bits per pixel ranking. For example, the content streaming engine and/or the adaptive bitrate controller executed at a device may determine a bitrate improvement priority based at least in part on the bits per pixel ranking. Depending on whether the bits per pixel ranking is from highest bits per pixel value to lowest bits per pixel value, or from lowest bits per pixel value to highest bits per pixel value, the adaptive bitrate controller may determine a bitrate improvement priority based at least in part on the bits per pixel ranking. For example, the content stream having the relative lowest bits per pixel value in the bits per pixel ranking may be determined to have the highest bitrate improvement priority. The ranking may therefore be used to determine which active content stream has the lowest bits per pixel value, and should be improved. Accordingly, the content stream associated with the lowest bits per pixel value may have the highest priority in the bitrate improvement priority. This may allow for an improved user experience, as the quality difference between active content streams may not be vastly different—by providing the highest bitrate improvement priority to the worst quality content stream, the worst quality content stream is continually being improved, and a discrepancy in quality between streams is reduced.

At block 250 of the process flow 200, computer-executable instructions stored on a memory of a device, such as a remote server or a user device, may be executed to cause a request to improve a bitrate of the first content stream to be approved. For example, the content streaming engine and/or the adaptive bitrate controller executed at a device may cause a request to improve a bitrate of the first content stream to be approved. As content is streamed, the associated content players and/or player instances may request approval to improve a bitrate of the content stream. For example, a first content player instance at which the first content stream is streamed may determine that an improved bitrate stream is available, such as from a different content server or other source. The first content player may therefore send a request to the adaptive bitrate controller for permission to switch content streams to the content stream with the improved bitrate. For instance, the first content player may determine that a connection to another egress or content server may result in a higher bitrate stream. However, the adaptive bitrate controller may approve requests for the content streaming having the highest bitrate improvement priority, or lowest bits per pixel value. The adaptive bitrate controller may reject or ignore requests from player instances associated with content streams that do not have the highest bitrate improvement priority. In the example of FIG. 2, because the first bits per pixel value is lower than the second bits per pixel value, and the first content stream therefore has the highest bitrate improvement priority of the active content streams, the adaptive bitrate controller may receive the request to switch to an improved bitrate content stream from the first content player instance, and may approve the request. For example, the adaptive bitrate controller may send an approval notification to the first content player. The first content player may therefore switch to the content stream having an improved bitrate for the first content. In some embodiments, approval of the request to improve the bitrate of the first content stream may cause an incremental increase in the bitrate of the first content stream. For example, the approval may indicate an amount of additional bandwidth that can be consumed by the first content stream. Instead of switching to a maximum available bitrate stream, the first content player may be allowed to switch from a 10 Mbps stream to a 12 Mbps stream, and not to a 15 Mbps stream. This may prevent reduced bandwidth for other content streams. If after the incremental improvement in bitrate, the first content stream still has the worst quality or highest bitrate improvement priority, the first content player may be allowed to switch to an incrementally improved bitrate stream again. In some embodiments, the adaptive bitrate controller may determine that network bandwidth is available prior to causing the request to improve the bitrate of the first content to be approved. For example, if there is no available bandwidth, the request from the first content player may not be approved. In other embodiments, the available bandwidth determination may not be performed by the adaptive bitrate controller.

At optional block 260 of the process flow 200, computer-executable instructions stored on a memory of a device, such as a remote server or a user device, may be executed to cause a request to improve a bitrate of the second content stream to be rejected. For example, the content streaming engine and/or the adaptive bitrate controller executed at a device may cause a request to improve a bitrate of the second content stream to be rejected. Because the content stream having the highest bitrate improvement priority is the first content stream, if a second content player instance associated with the second content stream sends a request to switch to a stream with an improved bitrate, the adaptive bitrate controller may reject the request. To reject the request, the adaptive bitrate controller may send a rejection notification to the second content player, or may ignore the request. The second content stream may therefore remain at the previous bits per pixel value.

Accordingly, the process flow 200 may be used to continually improve the lowest quality content stream that is presented at a device, or the lowest quality content stream that is presented at a device on a local network. The adaptive bit rate controller may therefore be executed on a device for management of multiple views or multiple content streams at the device in some embodiments. In other embodiments, the adaptive bitrate controller may be executed on a first device, and may manage content streams not only on the first device, but also on a second device that is in local network communication with the first device.

Figure 3:
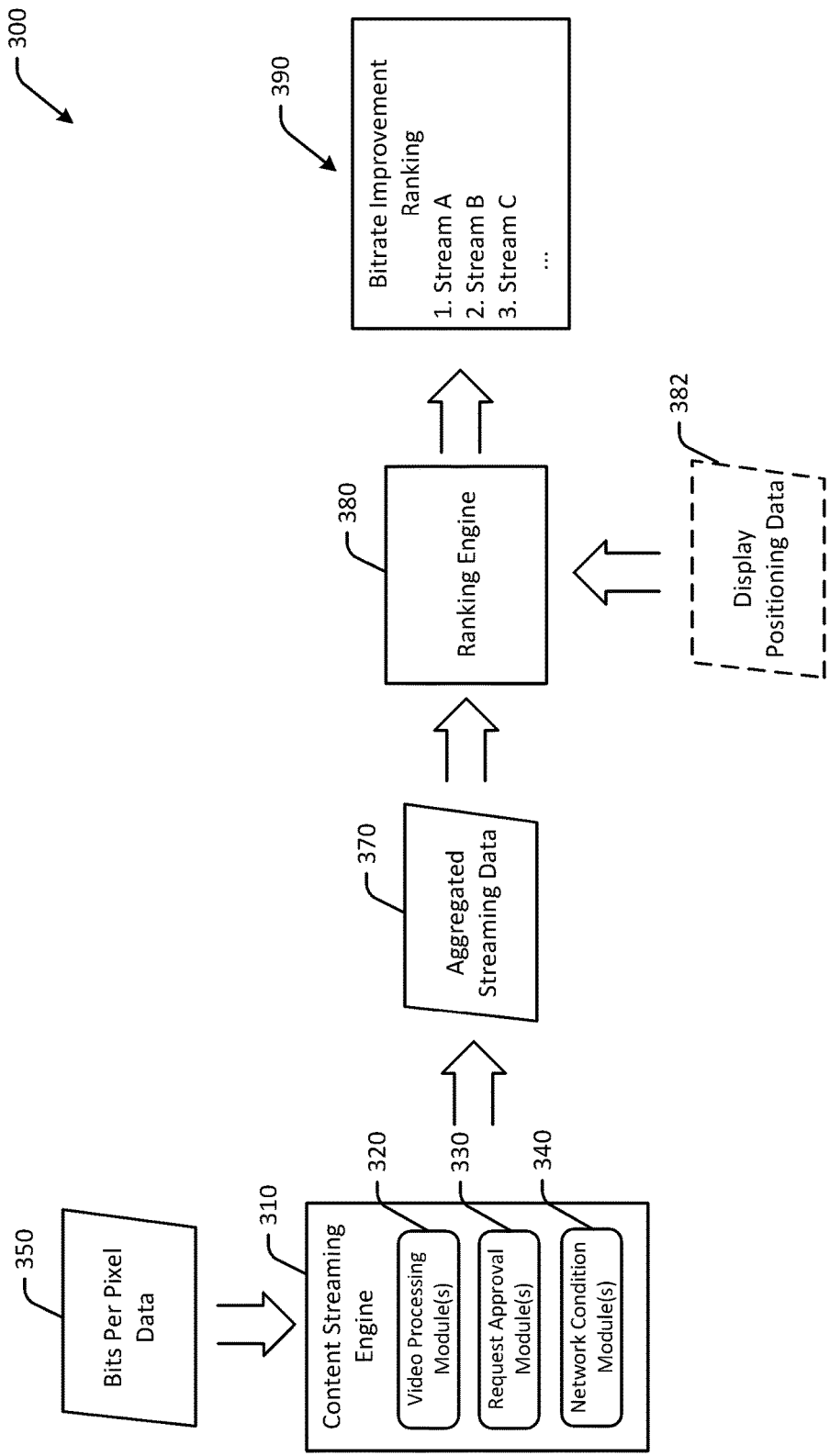
FIG. 3 is a schematic illustration of an example data flow for adaptive bitrate control for simultaneous content streaming in accordance with one or more example embodiments of the disclosure.

FIG. 3 is a schematic illustration of an example data flow 300 for adaptive bitrate control for simultaneous content streaming in accordance with one or more example embodiments of the disclosure. Different embodiments may include different, additional, or fewer inputs or outputs than those illustrated in the example of FIG. 3. The data flow 300 may be performed at a device at which multiple content streams are being presented, or may be performed at a device connected to a local network with multiple devices presenting at least one content stream each.

In FIG. 3, a content streaming engine 310 and/or one or more content streaming module(s) may be configured to detect or determine one or more features or quality metrics associated with streamed video content. The content streaming engine 310 may be stored at and/or executed by a user device or one or more remote servers. The content streaming engine 310 may include one or more modules or algorithms, and may be configured to output aggregated streaming data 370, which may include bits per pixel values for one or more active content streams. The content streaming engine 310 and a ranking engine 380 may be part of an adaptive bitrate controller.

For example, the content streaming engine 310 may include one or more video processing module(s) 320, one or more request approval module(s) 330, and/or one or more network condition module(s) 340. Additional or fewer, or different, modules may be included. The video processing module(s) 320 may be configured to process and/or analyze streamed video content. For example, the video processing module(s) 320 may be configured to communicate with content streaming players or player instances to determine various content stream metrics, such as screen or display resolution data, bitrate or bits per pixel data, display position data, and/or other data. The video processing module(s) 320 may be configured to register new content streams and to optionally request updated streaming data periodically. The video processing module(s) 320 may be configured to handle requests from content players or instances to switch content streams to higher or lower bitrates relative to existing content streams. For example, the video processing module(s) 320 may receive requests from player instances to switch to content streams having a higher bitrate than a current content stream.

The request approval module(s) 330 may be configured to generate approval and/or rejection notifications to requests to modify or switch content streams from players or player instances. For example, the request approval module(s) 330 may determine whether a request is to be approved or rejected based at least in part on a bitrate improvement ranking 390. The request approval module(s) 330 may be configured to identify the content stream having the worst quality, and may approve a request from a player associated with that content stream, while rejecting requests from other content stream players.

The network condition module(s) 340 may be configured to analyze and/or assess local network conditions. The network condition module(s) 340 may be configured to determine available bandwidth at a given point in time, as well as bandwidth consumed by individual content streams and/or bandwidth allocated to individual content streams. In some embodiments, the network condition module(s) 340 may be configured to determine an incremental amount by which a bitrate for a particular content stream can be increased, considering other factors such as bandwidth allocated to other content streams, bandwidth available to the device, and/or other factors.

The content streaming engine 310 may receive one or more inputs for which aggregated streaming data 370 is to be generated. For example, the content streaming engine 310 may receive bits per pixel data 350 from content streaming players or player instances. The bits per pixel data 350 may be determined by the respective content streaming players or instances and may be periodically sent to the content streaming engine. The content streaming engine 310 may optionally receive display resolution data and bitrate data associated with individual content streams, and may independently determine bits per pixel values. The display resolution data may represent a size of the content stream player window, or an amount of the display or screen covered by (or allocated to) the content stream. In some embodiments, the bits per pixel data 350 may be determined based at least in part on the display resolution data and a bitrate associated with the content stream.

The content streaming engine 310 may process the respective data associated with the content streams. For example, the bits per pixel data 350 may be processed using one or more of the video processing module(s) 320, the request approval module(s) 330, and/or the network condition module(s) 340.

Using one or more algorithms or modules, the content streaming engine 310 may generate the aggregated streaming data 370 based at least in part on the bits per pixel data 350. The aggregated streaming data 370 may represent quality metrics for some or all of the active content streams at a particular snapshot or point in time. As updated data is received by the content streaming engine 310, updated aggregated streaming data 370 may be output.

The aggregated streaming data 370 may be input at a ranking engine 380. The ranking engine 380 may be configured to generate the bitrate improvement ranking 390. The bitrate improvement ranking 390 may be used to determine which content stream should be allowed to switch to a content feed of improved bitrate. Accordingly, the bitrate improvement ranking 390 may be sent back to the content streaming engine 310 for use in approving or rejecting requests to improve bitrate. In some embodiments, the ranking engine 380 may receive aggregated streaming data 370 from more than one device, and may determine the bitrate improvement ranking 390 that integrates streaming content from multiple devices on the same local network.

The ranking engine 380 may ingest the aggregated streaming data 370 and may determine the bitrate improvement ranking 390. For example, the ranking engine 380 may be configured to determine bits per pixel values associated with individual content streams, and may determine which of the content streams has the lowest bits per pixel value. In some embodiments, the content stream with the lowest bits per pixel value may have the highest rank in the bitrate improvement ranking 390, such that the content stream of the worst quality is the first content stream that is allowed to switch to a stream with improved bitrate.

The ranking engine 380 may receive an optional additional input of display positioning data 382. The display positioning data 382 may indicate a position of a content stream on its respective display. For example, the display positioning data 382 may indicate that a content stream is in a primary display position in a picture-in-picture or other multi-view streaming environment. The ranking engine 380 may consider the display positioning data 382 in determining the bitrate improvement ranking 390. For example, if a content stream in a primary display position does not have the worst bits per pixel ranking, but has second to worst, the ranking engine 380 may rank the content stream as having the highest bitrate improvement ranking 390. This may be because although the content stream does not have the worst quality of the content streams, since it is the primary content stream being viewed, the user experience may be relatively more improved by improvement of the quality of the content in the larger content player window than in a smaller content player window.

The ranking engine 380 may therefore output the bitrate improvement ranking 390, which may be used to determine which requests to switch to improved bitrate content feeds are to be approved or rejected. In some embodiments, the content streaming engine 310 and/or the ranking engine 380 may be configured to determine, using the bitrate improvement priority 390, that a bitrate of a first content stream is to be improved before a bitrate of the second content is to be improved. After a request is approved or rejected, another bitrate improvement priority can be made to generated to determine which content stream is next to be upgraded.

Figure 4:
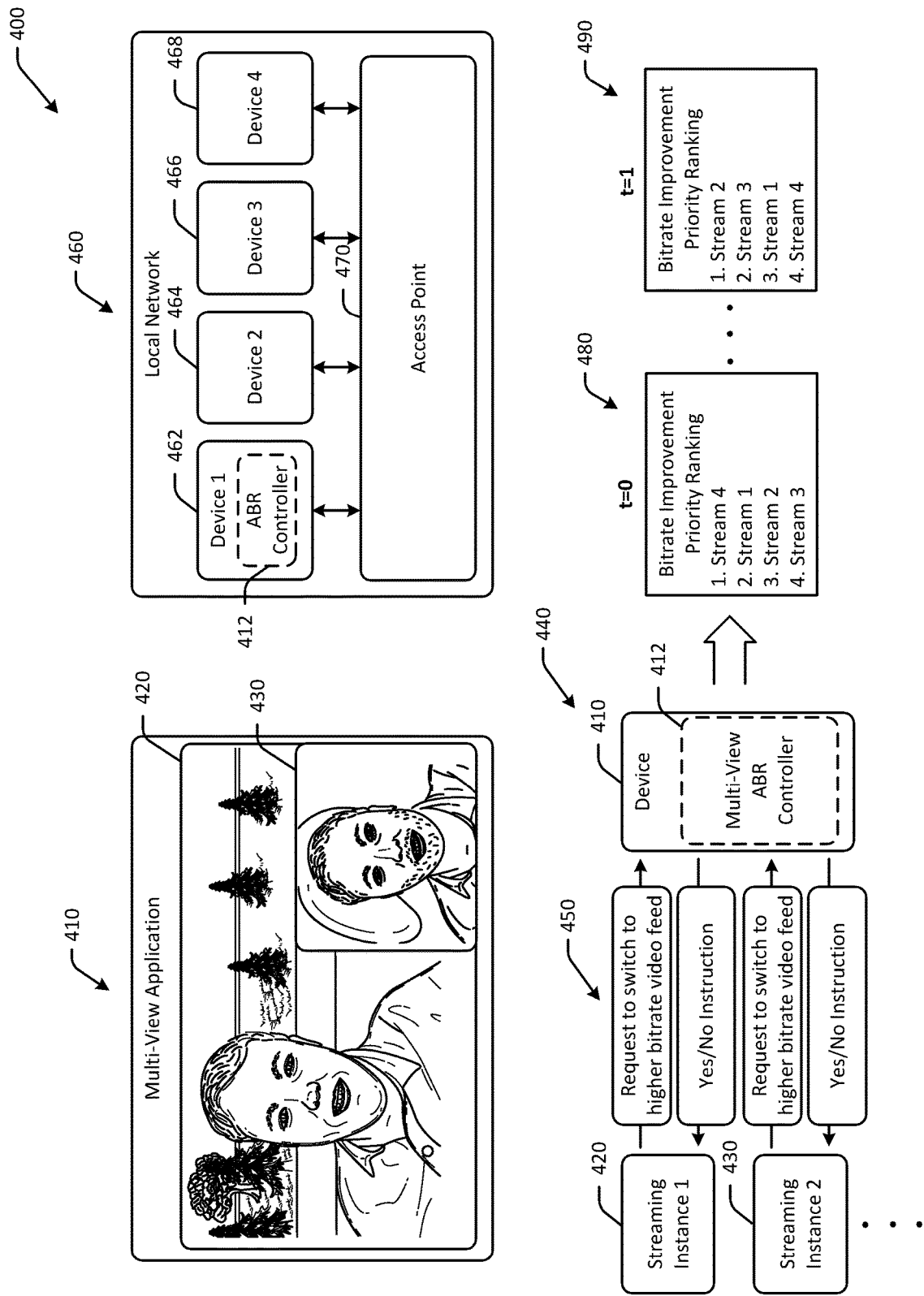
FIG. 4 is a schematic illustration of example adaptive bitrate control over a local network, and an example picture-in-picture feature, in accordance with one or more example embodiments of the disclosure.

FIG. 4 is a schematic illustration 400 of example adaptive bitrate control over a local network, and an example picture-in-picture feature, in accordance with one or more example embodiments of the disclosure. In FIG. 4, content streams are represented by individual frames. The content may be a movie, television show, or other video content. Other embodiments may have a different process flow than that illustrated in FIG. 4. The operations of the process flow in FIG. 4 may be performed in any suitable order across any number of devices, and may include operations that are performed at least partially concurrently.

In FIG. 4, a user may be streaming multiple content streams at the same time using a multi-view application on a device 410, such as a television content streaming device, a streaming stick, a mobile device, a computer, or another device. The streaming content may include a first content stream 420 and a second content stream 430. The first content stream 420 may be in a picture-in-picture arrangement with the second content stream 430. The first content stream 420 may occupy the primary position in the picture-in-picture arrangement, or may otherwise appear larger than the second content stream 430 (e.g., the first content stream 420 may be in a primary content display window, etc.). The first content stream 420 may have a greater display resolution than the second content stream 430.

In some embodiments, an adaptive bitrate controller may take into consideration whether a content stream is in the primary content window when generating bitrate improvement rankings. For example, if a content stream is in a primary position, or has a greater size or resolution than other content, it may be likely that the user is viewing the content, and therefore, the quality of that content stream may be improved before other content. In the example of FIG. 4, if the quality of the second content stream 430 was improved, it may be of little significance to the user experience due to its small size. Using bits per pixels may account for content size and position. For example, using bits per pixel as a quality measurement allows for a ranking that takes the viewing resolution into account, as larger resolutions have a lower bits per pixel value, which results in a higher priority to switch to a higher quality.

Accordingly, the adaptive bitrate controller may determine that the first content stream 420 is presented at a primary content display window, and may cause a request to improve a bitrate of the first content stream to be approved. In another example, the adaptive bitrate controller may determine that the first content display window is a primary content display window, and may receive a request from the content streaming application to switch to a video feed for the first content that has a greater bitrate than the current video feed for the first content. The adaptive bitrate controller may approve the request.

An example process flow 440 is provided for management of multiple content streams at a local device, such as the picture-in-picture feature of the multi-view application 410. The first content stream 420 may be a first streaming instance, and the second content stream 430 may be a second streaming instance. An adaptive bitrate controller 412 may be executing on the same device 410 as the multi-view application. The process flow 440 may include a number of communications 450 between the various streaming instances and the adaptive bitrate controller 412. For example, the first streaming instance 420 may send a request to switch to a higher bitrate video feed to the adaptive bitrate controller 412. In response, the adaptive bitrate controller 412 may send a yes or no (e.g., approval or rejection) communication. Similarly, the second streaming instance 430 may send a request to switch to a higher bitrate video feed to the adaptive bitrate controller 412. In response, the adaptive bitrate controller 412 may send a yes or no (e.g., approval or rejection) communication. This process may continue periodically until only one content stream is active.

The adaptive bitrate controller 412 may generate a bitrate improvement priority 480 that provides an order or ranking that may be used to determine which requests to improve content quality should be improved. The adaptive bitrate controller 412 may generate updated bitrate improvement priority rankings 490 over time, as bandwidth changes, bits per pixel values change, and so forth.

In another embodiment 460, an adaptive bitrate controller 412 may be executed on a first device 462. The first device 462 may be coupled to a local network via an access point 470. A number of other devices, such as a second device 464, a third device 466, a fourth device 468, and so forth may be connected to the local network. The adaptive bitrate controller 412 may be configured to manage content streams across all of the devices on the local network, so as to provide a uniform or near-uniform viewing experience for all users on the local network. For example, the adaptive bitrate controller 412 may determine a third content stream that is presented at the second device 464 in local network communication with the first device 462, and may generate an updated bits per pixel ranking to include a bits per pixel value associated with the third content stream. The adaptive bitrate controller 412 may therefore be configured to include content streams from multiple devices connected to the same local network in the bitrate improvement priority ranking. Bandwidth utilization may therefore be optimized across the local network.

Figure 5:
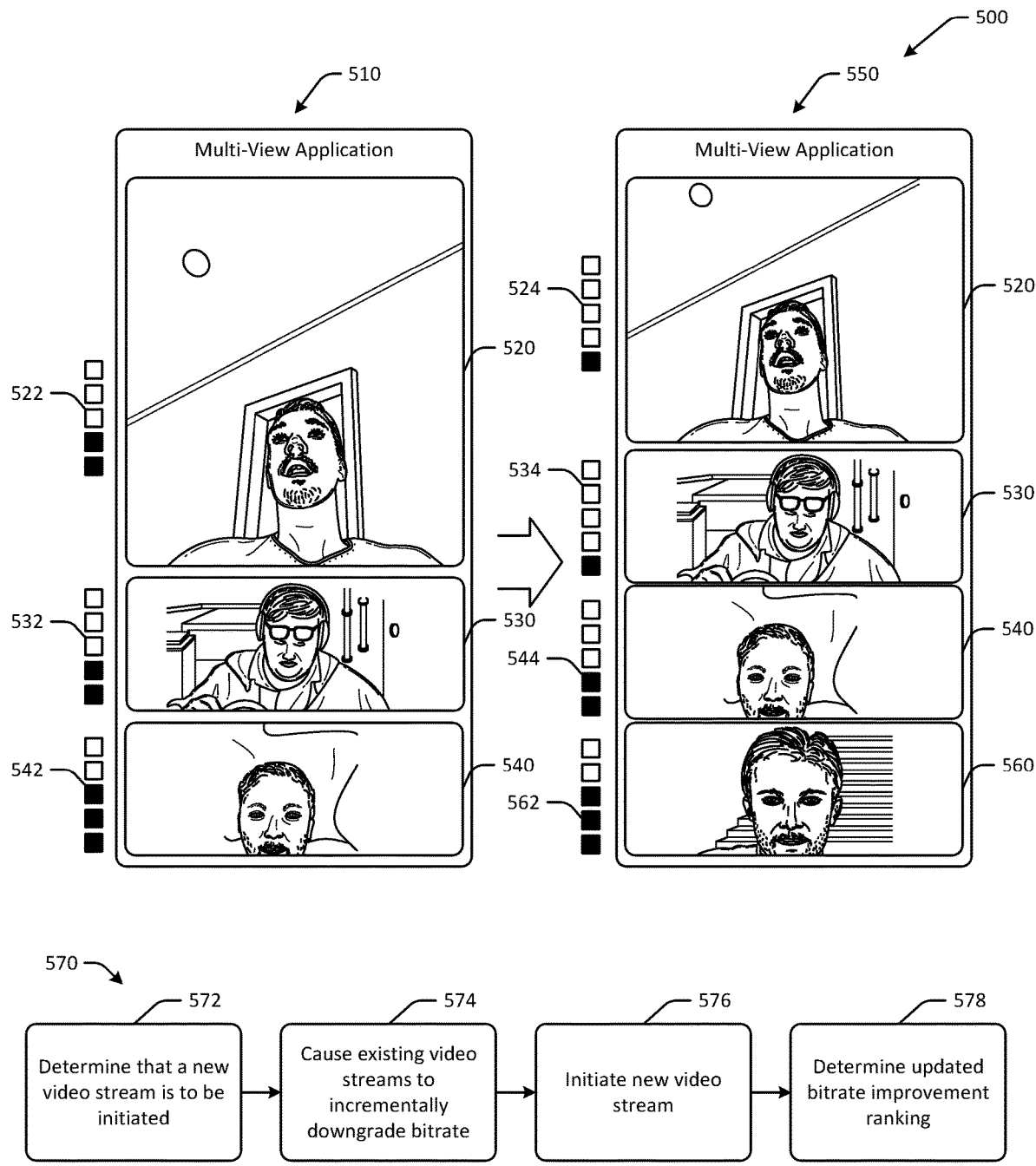
FIG. 5 is a schematic illustration of an example use case of adaptive bitrate control where a new content stream is added to existing content streams in accordance with one or more example embodiments of the disclosure.

FIG. 5 is a schematic illustration of an example use case 500 of adaptive bitrate control where a new content stream is added to existing content streams in accordance with one or more example embodiments of the disclosure. In FIG. 5, content streams are represented by individual frames. The content may be a movie, television show, or other video content. Other embodiments may have a different process flow than that illustrated in FIG. 5. The operations of the process flow in FIG. 5 may be performed in any suitable order across any number of devices, and may include operations that are performed at least partially concurrently.

As a user is consuming one or more content streams, the user may decide to add another content stream. For example, the user may be watching a football game, and may decide to add an additional content stream of a different angle or view of the football game, such as a sideline view in addition to a default sky view. In situations where a new content stream is to be added, some embodiments may, at least temporarily, cause existing content streams to downgrade a bitrate so as to provide bandwidth for the new content stream that is to be added. In this manner, the new content stream may not have a significantly worse quality than the existing content streams. In addition, the content streams that were downgraded to a reduced bitrate may be subsequently increased to their previous bitrate through the bitrate improvement ranking process (e.g., the worst stream will continue to be improved, etc.), so as to have uniform or near-uniform streaming quality for all content that is streamed.

In FIG. 5, at a first point in time 510, a user may be streaming a first content stream 520, a second content stream 530, and a third content stream 540. The first content stream 520 may have a first quality metric 522 that may be a representation of the bits per pixel value associated with the first content stream 520. The second content stream 530 may have a second quality metric 532 that may be a representation of the bits per pixel value associated with the second content stream 530. The third content stream 540 may have a third quality metric 542 that may be a representation of the bits per pixel value associated with the third content stream 540. In the example of FIG. 5, at the first point in time 510, the third content stream 540 may have a slightly better quality, or higher bitrate, than the first content stream 520 and the second content stream 530, as represented by the filled squares in the bar graph depicted in FIG. 5. At the first point in time 510, the first content stream 520 may have the highest priority for bitrate improvement due to the first content stream 520 having the lowest bits per pixel value. However, the user may desire to add a new content stream to a multi-view application and/or to the device.

Accordingly, at a second point in time 550, a fourth content stream 560 may be added to the existing content streams. To allocate bandwidth for the fourth content stream 560, the adaptive bitrate controller in communication with the multi-view application may cause the first content stream 520 to reduce its quality to a fourth quality metric 524 that represents a lower bits per pixel value than the first quality metric 522. Similarly, the adaptive bitrate controller may cause the second content stream 530 to reduce its quality to a fifth quality metric 534 that represents a lower bits per pixel value than the second quality metric 532, and the third content stream 540 to reduce its quality to a sixth quality metric 544 that represents a lower bits per pixel value than the third quality metric 542. The fourth content stream 560 may then be initiated at a seventh quality metric 562. To effect reductions in bitrate or quality, the adaptive bitrate controller may reduce bandwidth allocations for the respective content streams, in one example.

In the example of FIG. 5, the fourth content stream 560 may have a higher bits per pixel value than the other content streams. As a result, the other content streams may be allowed to switch to higher bitrate feeds before the fourth content stream 560 is allowed to switch to a higher bitrate feed.

Accordingly, adding or removing content streams may be intelligently managed by the adaptive bitrate controller, so as to maintain a uniform or close-to-uniform viewing experience across any number of active content streams. In some embodiments, if sufficient bandwidth is available, the adaptive bitrate controller may not cause existing content streams to downgrade quality or reduce bitrate.

In some embodiments, the adaptive bitrate controller may be configured to execute a process flow 570 to manage adding and/or subtracting content streams. At a first block 572, the adaptive bitrate controller may determine that a new video stream is to be initiated. For example, the adaptive bitrate controller may receive an indication from an application, or may otherwise receive registration data from a content player or player instance indicating that a new content stream is to be initiated.

At a second block 574, the adaptive bitrate controller may cause existing video streams to incrementally downgrade quality or bitrate. For example, the adaptive bitrate controller may determine that available bandwidth is insufficient to support another content stream at the same quality as the existing content streams. The adaptive bitrate controller may therefore cause the existing content streams to reduce bitrate by at least one increment. The increment size may be fixed or dynamic. For example, the increment size may be 1 Mbps, or may be 10%, or may be determined based on available bandwidth (e.g., dynamically determined). The adaptive bitrate controller may therefore cause the existing streams to slightly decrease bitrate. For example, a content stream can decrease bitrate in discrete hops. This may be dependent in how the different adaptive bit rate levels are encoded at the encoder. For instance, if there are three adaptive bit rate levels at 1, 5, and 10 Mbps and streams are currently playing at 10 Mbps, the streams may be dropped to the next lower adaptive bit rate level at 5 Mbps.

At a third block 576, the new video stream may be initiated. For example, in FIG. 5, the fourth content stream 560 may be initiated. The new content stream may be initiated at a bits per pixel value that is at least equal to or greater than the existing content stream that has the worst bits per pixel value.

At a fourth block 578, the adaptive bitrate controller may determine an updated bitrate improvement ranking. The updated bitrate improvement ranking may include the new content stream. However, because the new content stream should not have the worst bits per pixel value, the updated bitrate improvement ranking should include one of the previously existing content streams as the content stream having the highest ranking for improvement.

In another embodiment, a device may use a multi-view content application to stream first content, second content, and third content. The user may desire to add a stream of fourth content. The adaptive bitrate controller may determine that fourth content is to be streamed in a fourth content display window of the content streaming application at the same time as the first content, the second content, and the third content. The adaptive bitrate controller may cause the content streaming application to switch to respective video feeds for the first content, the second content, and the third content that have reduced bitrates relative to the current respective video feeds. The adaptive bitrate controller may configure the content streams such that that the total bitrate before reduction of bitrates for the previously streaming content streams is not exceeded after the new content stream is added. In some embodiments, the controller may cause the content streaming application to stream the fourth content at a bitrate equal to or greater than a lowest bitrate of the reduced bitrates.

In another example, the adaptive bitrate controller may be configured to determine that a third content stream is initiated at a device at which a first content stream and second content stream are existing. The adaptive bitrate controller may cause the first content stream to switch from the first bits per pixel value to third bits per pixel value that is less than the first bits per pixel value, and may cause the second content stream to switch from the second bits per pixel value to fourth bits per pixel value that is less than the second bits per pixel value. The adaptive bitrate controller may cause the third content stream to stream at a bitrate equal to or greater than a lower of the third bits per pixel value and the fourth bits per pixel value.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
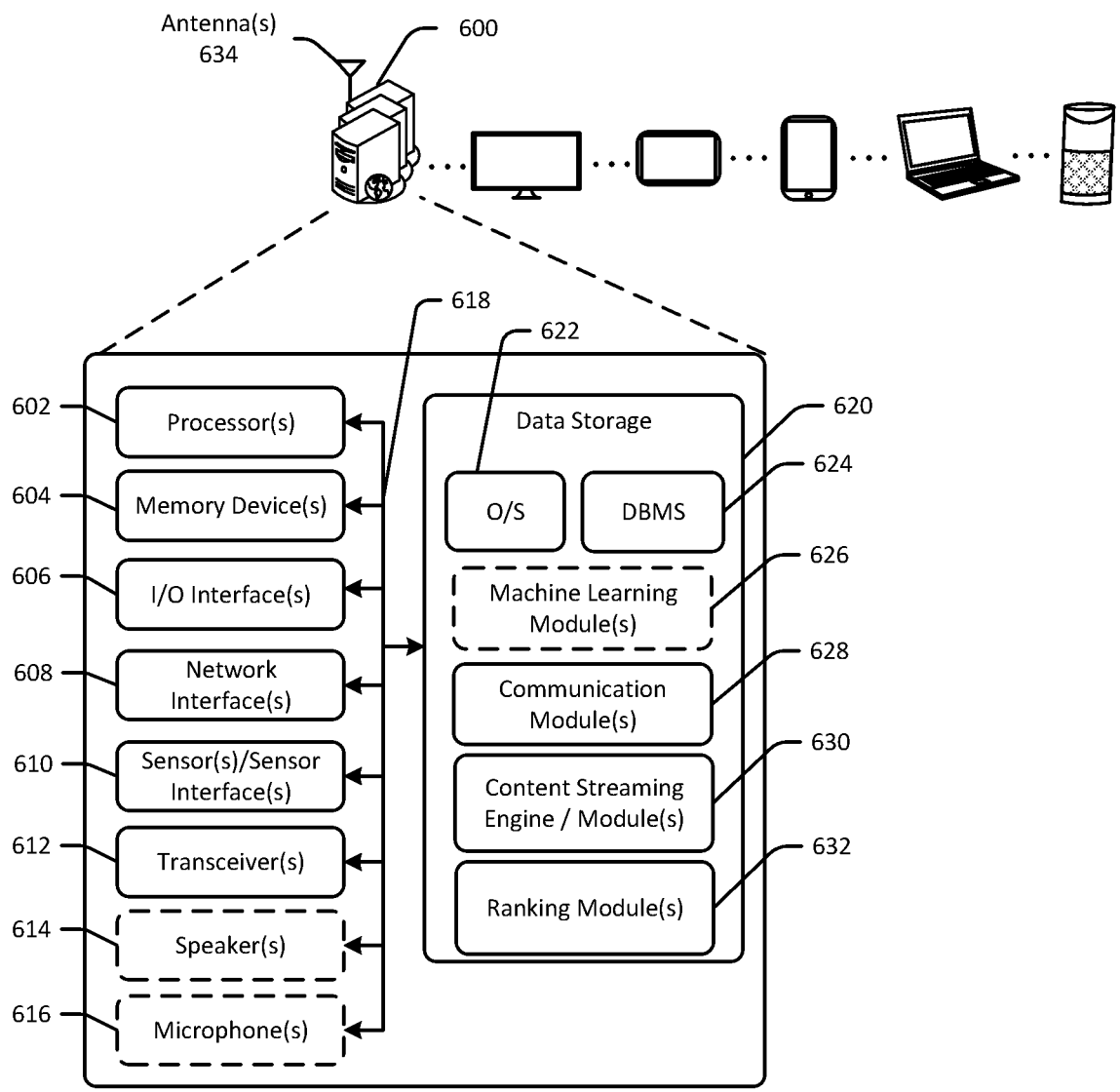
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, search engines, user devices, or the like. In some embodiments, a single remote server or single group of remote servers may be configured to perform more than one type of multi-view adaptive bitrate determinations and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(s) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional machine learning module(s) 626, one or more communication module(s) 628, one or more content streaming engine/module(s) 630, and/or one or more ranking module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, active streaming data, available bandwidth data, historical network performance information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional machine learning module(s) 626 may include computer-executable instructions, code, or the like that responsive to execution by one or more of the processor(s) 602 may perform functions including, but not limited to, determining approval of requests to improve bitrate, determining rejection of requests to improve bitrate, determining bits per pixel values, determining bandwidth usage, determining or detecting actions and/events, generating one or more machine learning models or algorithms, determining or classifying objects or actions, determining frames of content, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content streaming engine/module(s) 630 may include computer-executable instructions, code, or the like that responsive to execution by one or more of the processor(s) 602 may perform functions including, but not limited to, analyzing digital content, detecting servers and/or communicating with egress systems, determining streaming content quality values, determining streaming content, determining or analyzing audio files, identifying certain portions of content, extracting segments of content, generating video files, and the like.

The ranking module(s) 632 may include computer-executable instructions, code, or the like that responsive to execution by one or more of the processor(s) 602 may perform functions including, but not limited to, determining video files, generating rankings for streaming content quality metrics, determining content display size, determining content screen resolution, determining requests to improve bitrate, generating search results, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards.

The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by an adaptive bitrate controller executed by one or more computer processors coupled to memory, that first content is being streamed in a first content display window of a content streaming application;
   determining that second content is being streamed in a second content display window of the content streaming application at the same time as the first content;
   determining that third content is being streamed in a third content display window of the content streaming application at the same time as the first content;
   determining a first bits per pixel value for the first content at a first timestamp, wherein the first bits per pixel value is indicative of a presentation quality of the first content;
   determining a second bits per pixel value for the second content at the first timestamp, wherein the second bits per pixel value is indicative of a presentation quality of the second content;
   determining a third bits per pixel value for the third content at the first timestamp, wherein the third bits per pixel value is indicative of a presentation quality of the third content;
   determining that the third bits per pixel value is less than the first bits per pixel value and the second bits per pixel value;
   receiving a first request from the content streaming application to switch to a video feed for the first content that has a greater bitrate than a current video feed for the first content;
   denying the first request;
   receiving a second request from the content streaming application to switch to a video feed for the second content that has a greater bitrate than a current video feed for the second content;
   denying the second request;
   receiving a third request from the content streaming application to switch to a video feed for the third content that has a greater bitrate than a current video feed for the third content; and
   approving the third request.

2. The method of claim 1, further comprising:
   determining a fourth bits per pixel value for the first content at a second timestamp after the third request is approved;
   determining a fifth bits per pixel value for the second content at the second timestamp;
   determining a sixth bits per pixel value for the third content at the second timestamp;
   determining that the fourth bits per pixel value is less than the fifth bits per pixel value and the sixth bits per pixel value; and
   prioritizing a bitrate improvement for the first content over bitrate improvements for the second content and the third content.

3. The method of claim 1, further comprising:
   determining that the first content display window is a primary content display window;
   receiving a fourth request from the content streaming application to switch to a video feed for the first content that has a greater bitrate than the current video feed for the first content; and
   approving the fourth request.

4. The method of claim 1, further comprising:
   determining that fourth content is to be streamed in a fourth content display window of the content streaming application at the same time as the first content, the second content, and the third content;
   causing the content streaming application to switch to respective video feeds for the first content, the second content, and the third content that have reduced bitrates relative to the current respective video feeds; and
   causing the content streaming application to stream the fourth content at a bitrate equal to or greater than a lowest bitrate of the reduced bitrates.

5. A method comprising:
   determining, by an adaptive bitrate controller, a first bits per pixel value associated with a first content stream at a device at a first timestamp;
   determining a second bits per pixel value associated with a second content stream at the device at the first timestamp;
   generating a bits per pixel ranking using the first bits per pixel value and the second bits per pixel value;
   determining a bitrate improvement priority based at least in part on the bits per pixel ranking; and
   causing a request to improve a bitrate of the first content stream to be approved.

6. The method of claim 5, further comprising:
   causing a request to improve a bitrate of the second content stream to be rejected;
   wherein approval of the request to improve the bitrate of the first content stream causes an incremental increase in the bitrate of the first content stream.

7. The method of claim 5, further comprising:
   determining, using the bitrate improvement priority, that a bitrate of the first content stream is to be improved before a bitrate of the second content stream is to be improved.

8. The method of claim 7, further comprising:
   determining that the second content stream is presented at a primary content display window; and
   causing a request to improve a bitrate of the second content stream to be approved.

9. The method of claim 5, further comprising:
   determining that a third content stream is initiated at the device;
   causing the first content stream to switch from the first bits per pixel value to a third bits per pixel value that is less than the first bits per pixel value; and
   causing the third content stream to stream at a bitrate equal to or greater than a lower of the third bits per pixel value.

10. The method of claim 5, wherein a lowest bits per pixel value has a highest priority in the bitrate improvement priority.

11. The method of claim 5, further comprising:
    determining that network bandwidth is available prior to causing the request to improve the bitrate of the first content stream to be approved.

12. The method of claim 5, further comprising:
    determining that either a bitrate or a resolution associated with the first content stream or the second content stream has changed; and
    determining an updated bitrate improvement priority.

13. The method of claim 5, wherein the adaptive bitrate controller is executed on the device.

14. The method of claim 5, wherein the device is a first device, and wherein the adaptive bitrate controller is executed on a second device that is in local network communication with the first device.

15. The method of claim 14, further comprising:
determining, by the adaptive bitrate controller, a third content stream that is presented at a third device in local network communication with the second device; and
generating an updated bits per pixel ranking to include a bits per pixel value associated with the third content stream.

16. A device comprising:
memory configured to store computer-executable instructions; and
at least one computer processor configured to access the memory and execute the computer-executable instructions to:
determine a first bits per pixel value associated with a first content stream at a device at a first timestamp;
determine a second bits per pixel value associated with a second content stream at the device at the first timestamp;
generate a bits per pixel ranking using the first bits per pixel value and the second bits per pixel value;
determine a bitrate improvement priority based at least in part on the bits per pixel ranking; and
cause a request to improve a bitrate of the first content stream to be approved.

17. The device of claim 16, wherein the at least one processor is further configured to access the memory and execute the computer-executable instructions to:
cause a request to improve a bitrate of the second content stream to be rejected;
wherein approval of the request to improve the bitrate of the first content stream causes an incremental increase in the bitrate of the first content stream.

18. The device of claim 16, wherein the at least one processor is further configured to access the memory and execute the computer-executable instructions to:
determine, using the bitrate improvement priority, that a bitrate of the first content stream is to be improved before a bitrate of the second content stream is to be improved;
determine that the second content stream is presented at a primary content display window; and
cause a request to improve a bitrate of the second content stream to be approved.

19. The device of claim 16, wherein the at least one processor is further configured to access the memory and execute the computer-executable instructions to:
determine that a third content stream is initiated at the device;
cause the first content stream to switch from the first bits per pixel value to third bits per pixel value that is less than the first bits per pixel value;
cause the second content stream to switch from the second bits per pixel value to fourth bits per pixel value that is less than the second bits per pixel value; and
cause the third content stream to stream at a bitrate equal to or greater than a lower of the third bits per pixel value and the fourth bits per pixel value.

20. The device of claim 16, wherein a lowest bits per pixel value has a highest priority in the bitrate improvement priority.

* * * * *